United States Patent [19]
Kozu et al.

[11] 3,840,390
[45] Oct. 8, 1974

[54] PHOTOCURING COMPOSITIONS CURED BY LIGHT IRRADIATION

[75] Inventors: Haruo Kozu, Oiso-machi; Morio Kimura; Koichiro Murata, both of Hiratsuka, all of Japan

[73] Assignee: Kansai Paint Company, Limited, Amagasaki-shi, Hyogo-ken, Japan

[22] Filed: Apr. 11, 1972

[21] Appl. No.: 243,046

Related U.S. Application Data

[63] Continuation-in-part of Ser. No. 873,069, Oct. 31, 1969, abandoned.

[30] Foreign Application Priority Data

Nov. 7, 1968  Japan............................. 43-80937

[52] U.S. Cl... 117/93.31, 117/161 UC, 204/159.16, 260/78.5 EB
[51] Int. Cl. .......................... B44d 1/50, C08f 3/62
[58] Field of Search........ 260/78.5 EB, 80.81, 80.8, 260/878, 881, 885; 204/159.15, 159.16, 159.17; 117/93.31, 161 UC

[56] References Cited
UNITED STATES PATENTS 3,412,074  11/1968  Derrick............................. 260/78.4
3,448,089   6/1969  Celeste ............................ 260/78.5

FOREIGN PATENTS OR APPLICATIONS 861,871  3/1961  Great Britain..................... 260/78.5

*Primary Examiner*—William D. Martin
*Assistant Examiner*—John H. Newsome
*Attorney, Agent, or Firm*—Wenderoth, Lind & Ponack

[57]  ABSTRACT

The present invention relates to a photocuring composition and to methods of applying said composition to surfaces by light irradiation, which photocuring composition is prepared by blending a photosensitizer into a vinyl monomer solution of an acrylic resin containing unsaturated groups produced by the half-esterification of an acrylic resin having acid anhydride groups and a polymerizable unsaturated monomer having hydroxyl group or produced by the half-esterification of an acrylic resin having hydroxyl groups and a polymerizable unsaturated monomer having acid anhydride group.

8 Claims, No Drawings

PHOTOCURING COMPOSITIONS CURED BY LIGHT IRRADIATION

This is a continuation-in-part of applicants' copending application Ser. No. 873,069, filed Oct. 31, 1969, now abandoned.

This invention concerns a new coating composition which is cured by light irradiation and methods of applying the composition to various objects. More particularly, the present invention relates to a photocuring coating composition produced by adding a photosensitive to a vinyl monomer solution of an acrylic resin containing ethylenically unsaturated groups produced by (a) a half-esterification between an acrylic resin having acid anhydride groups and a polymerizable ethylenically unsaturated monomer having a hydroxyl group or by (b) a half-esterification between an acrylic resin having hydroxyl groups and a polymerizable ethylenically unsaturated monomer having an acid anhydride group.

The coating composition obtained by this invention is cured rapidly and completely when coated on an object and light irradiated and furthermore, it has numerous other advantages in that the cost of facility is low and in that it can be applied as a surface coating on organic objects such as wood, plastics and paper. Needless to say, sunlight can be used as the light source for irradiation, but also, high efficiency illumination lamps such as xenon lamp, carbon arch lamp, and low pressure, middle pressure, high pressure and ultra-high pressure mercury lamps which are available on the market may be used. The time required for curing by the latter light sources is from several seconds to several tens of seconds, and a high speed continuous coating process, such as a high speed coil coating of over several tens of meters per minute, can be carried out with a small plant floor space.

Several vinyl monomers which form polymers when polymerized by light irradiation in the presence of a photosensitizer are known. The present inventors' attention was drawn to this and as a result of intensive research, they found that acrylic resins in which polymerizable unsaturated groups have been introduced cure easily in the presence of a photosensitizer.

Acrylic resins are widely used in thermoplastic type paints or thermosetting type paints and various kinds of such resins for use in accordance with the present invention are available commercially. As examples of such resins, there may be used methacrylate esters such as methyl methacrylate and n-butyl methacrylate, acrylate esters such as ethyl acrylate and n-butyl acrylate, vinyl aromatic hydrocarbons such as styrene and vinyl toluene or vinyl monomers having various functional groups such as acrylonitrile, acrylamide, acrylic acid and β-hydroxyethyl methacrylate, and these are made into the resin state by polymerizing them independently or by copolymerizing two or more of these materials. The resins are solution-polymerized in a non-polymerizable volatile solvent and supplied as they are in a solution state, or the solvent is removed and the resin is supplied in the solid state. Also, depending on the composition, the resins can be obtained in the aqueous state, such as in an aqueous solution or emulsion.

Generally, substantially no strong polymerizable bonds remain in the molecular structure of such acrylic resin. Consequently, only mutual polymerization among molecules takes place when a monomer solution of such resin is irradiated by light and as crosslinkage does not take place between the acrylic resin molecules, superior performance in actual use as coating cannot be anticipated. Needless to say, it is possible to provide a reticular structure by using polyfunctional, polymerizable monomers simultaneously, but the formation of the reticular structure is very limited as the acrylic resin does not essentially possess polymerizable, functional groups. Consequently, even if a large quantity of a poly-functional polymerizable monomer is added in order to develop a reticular structure, it is difficult to obtain a valuable, practical, tough coating.

This invention is not based on the aforementioned method but is a method in which a functional group which has polymerizing properties is introduced into the acrylic resin. When light is irradiated to cure this, the acrylic resin molecule, which is the basic material, forms a portion of the reticular structure and a coating composition which is superior as a paint coating can be obtained.

If it is possible to use a vinyl monomer such as β-hydroxyethyl methacrylate or β-hydroxyethyl acrylate or β-hydroxypropyl acrylate as a part of the acrylic resin composition and bond unsaturated carboxylic acids such as methacrylic acid or acrylic acid to this hydroxyl group by esterification, or, conversely, to use a vinyl monomer having a carboxylic acid group as a part of the copolymer composition and bonding a vinyl monomer having a hydroxyl group to the carboxylic acid by esterification, it should be possible to obtain a modified acrylic resin having polymerizable ethylenically unsaturated bonds. However, the polymerizing properties of hydroxyalkyl methacrylates and hydroxyalkyl acrylates, and more particularly, methacrylic acid and acrylic acid, are very strong as they polymerize to a considerable extent by heating to a high reaction temperature, such as that of the esterification reaction (over 150°C), even in the absence of a polymerization initiator. Consequently, even if an attempt is made to introduce an unsaturated group into the acrylic resin by the esterification reaction, it will not be possible to introduce the unsaturated component sufficiently because gelation of the entire reaction system takes place. Also, in the case of methacrylic acid and acrylic acid, it is not possible to actually heat these to a high temperature, for example about 180° – 220°C, which is suitable for esterification of a reaction system containing equivalents thereof, because their boiling points are relatively low. Consequently, the method of obtaining unsaturated acrylic resins having polymerizing properties by introducing unsaturated groups by esterification has not been carried out generally in the past because of such difficulties from the practical point of view.

In this invention, the method of introducing easily polymerizable unsaturated groups into acrylic resins within a short time without any gelation taking place during the reaction by using a half-esterification method is carried out in order to avoid the aforementioned steps in which said difficulties are present.

That is, a half-esterification reaction between the hydroxyl group and the acid anhydride group is used, or more concretely, an acrylic resin having units of a monomer containing an acid anhydride group is bonded through the acid anhydride groups with a polymerizable unsaturated monomer having hydroxyl groups, or an acrylic resin having units of a monomer containing a hydroxyl group is bonded through the hydroxyl group with a polymerizable unsaturated monomer having acid anhydride groups by half-esterification, by which polymerizable unsaturated groups can be introduced easily into the acrylic resin to attain the desired object of this invention.

Polymerizable unsaturated monomers having hydroxyl groups which can be used herein include hydroxyalkyl methacrylate esters such as β-hydroxyethyl methacrylate and β-hydroxypropyl methacrylate, hydroxyalkyl acrylate esters such as β-hydroxyethyl acrylate and β-hydroxypropyl acrylate, and allylic unsaturated alcohols such as allyl alcohol and methallyl alcohol. Similarly, the polymerizable unsaturated monomers having acid anhydride groups which can be used include maleic anhydride, tetrahydrophthalic anhydride and endo-cis-bicyclo-(2,2,1)-5-pentene-2,3-dicarboxylic anhydride (trade name Himic Anhydride manufactured by Hitachi Kasei Kogyo Co.).

Generally, the half-esterification reaction between the hydroxyl group and the acid anhydride group is completed in about 1 hour at a reaction temperature of about 100°C and there is almost no polymerization of the vinyl monomer under such reaction conditions, and when a polymerization inhibitor is used, there is entirely no polymerization, in the presence of a trace quantity (60 – 100 ppm) of a polymerization inhibitor such as hydroquinone or tert-butyl catechol. As polymerization inhibitors normally are added to commercial vinyl monomers, it is not necessary to add a further inhibitor. Particularly in the case of the above-mentioned second reaction, i.e., the reaction between an acrylic resin having hydroxyl groups and an unsaturated monomer having acid anhydride groups, there is no possibility of gelation when either maleic anhydride or tetrahydrophthalic anhydride, which do not have polymerizing properties, per se, are used as the monomers. Also, even in the case of the first reaction, i.e., the reaction between an acrylic resin having acid anhydride groups and an unsaturated monomer having hydroxyl groups, there is no possibility of gelation if allyl alcohol or methallyl alcohol, which have low polymerizing properties, are used as the monomers. Thus, it is possible to introduce polymerizable unsaturated groups into the acrylic resin easily and within a short time without the possibility of gelation by using the half-esterification reaction of the method of this invention.

The method of the present invention is described more concretely below.

In the first method, an acrylic rsin having (a) acid anhydride groups or (b) hydroxyl groups as mentioned above is prepared by the conventional solution polymerization method and unsaturated groups are bonded to the acrylic resin by carrying out half-esterification with (a) polymerizable unsaturated monomers having hydroxyl groups or (b) polymerizable unsaturated monomers having acid anhydride groups. In this method, solvents which obstruct the half-esterification reaction between the resin and monomer, such as alcohols, cannot be used. The acrylic resin into which unsaturated groups have been introduced in this manner itself has the so-called self-curing property and can form cross-linkages among molecules to obtain cured film by coating a volatile organic solution of the resin on the object to be coated, vaporizing the solvent and irradiating with light. However, it is difficult to increase the cross-linkage density of the acrylic resins which do not have any polymerizing properties, per se, or wich have very low polymerizing properties as mentioned above, and, furthermore, rapid curing is obstructed because considerable time is required for volatilizing a greater portion of this volatile solvent.

Consequently, in such a case, it is desirable to use the method of vaporizing the solvent as much as possible from the resin varnish to make it into a paste form or solid form, or by precipitating only the resin content by charging into a large quantity of a poor solvent such as methanol or petroleum ether, removing the precipitate and drying this to make it into solid state and then dissolving the solid resin in a liquid polymerizable monomer. In this case, the curing property can be exhibited sufficiently if an acrylic resin having unsaturated groups which do not have polymerizing properties or which have very low polymerizing properties, per se, is dissolved in a liquid polymerizable monomer which reacts readily with such unsaturated groups.

For example, an acrylic resin which has an unsaturated maleate component which does not have polymerizing properties by itself can be dissolved in styrene, or an acrylic resin into which has been introduced so-called alicyclic unsaturated groups obtained by half-esterification of tetrahydrophthalic anhydride or endo-cis-bicyclo-(2,2,1)-5-heptene-2,3-dicarboxylic anhydride may be dissolved in a monomer composition containing acrylic acid, methacrylic acid, acrylic acid esters or methacrylic acid esters, respectively, or an acrylic resin in which allylic unsaturated groups having very low polymerizing properties may be dissolved in a monomer composition containing acrylic acid or methacrylic acid in order to attain the desired objective.

In the second method, solvents which react such as those of the first method are not added separately but, rather, the preparation of acrylic resin and half-esterification reaction are carried out simultaneously, or continuous reactions are carried out. That is, (a) polymerizable unsaturated monomers which have acid anhydride groups as mentioned above, for example maleic anhydride, are polymerized with a liquid vinyl monomer which can react with this monomer, for example styrene- or a mixture thereof with another vinyl monomer, for example a mixture of styrene and methyl methacrylate are polymerized to a polymerization conversion of about 30 – 70 percent without using solvents (in this case there will be almost no unreacted, residual maleic anhydride if an excess of styrene with respect to maleic anhydride is used), a polymerizable unsaturated monomer having hydroxyl groups containing a small quantity (60 – 100 ppm) of a polymerization inhibitor is added and the half-esterification reaction carried out; (b) polymerizable unsaturated monomers having hydroxyl groups, for example β-hydroxyethyl methacrylate, and one or more other vinyl monomers, for example acrylic ester, methacrylic ester and styrene, are polymerized to a polymerization conversion of about 30 – 70 percent without using a solvent, a small quantity (60 – 100 ppm) of a polymerization inhibitor and a polymerizable unsaturated monomer having acid anhydride groups are added and the half-esterification reaction carried out. In this case, it will not be necessary to add polymerization inhibitors during the half-esterification reaction if a vinyl monomer which copolymerizes with the unsaturated monomer containing acid anhydride groups used in this method is removed beforehand, because it has little or no polymerizing properties, per se, as mentioned above. Likewise, polymerization inhibitors need not be added if the monomers containing acid anhydride groups are mixed prior to polymerization and if the polymerization and half-esterification reactions are carried out simultaneously. Vinyl monomers which can copolymerize with monomers containing acid anhydrides are added after these reactions are completed.

In the second method, it is not necessary to remove the solvent as in the case of the first method, and it can be coated as it is on the objects to be coated because it is a monomer solution which can be irradiated with light without further treatment.

The percentage of acid anhydride groups or hydroxyl groups which are introduced into the acrylic resin depends on the extent of unsaturated components to be introduced into the acrylic resin. As a general rule, it is considered that at least two acid anhydride groups or hydroxyl groups per polymer molecule of acrylic resin is desirable in order to obtain sufficient cross-linkage density when cured.

The modified acrylic resin prepared in this manner is adjusted to a suitable composition by supplementing liquid polymerizable monomers as required and to a suitable viscosity in order to make it easy to use. Non-polymerizable organic solvents, especially those having low boiling points, in place of part of the liquid polymerizable monomer, may be used if the quantity of non-polymerizable organic solvents is small. In this case, a polymerization inhibitor is added, as required, for stable storage over a long period of time.

The composition prepared in the above manner can be cured by irradiating light as it is, but as considerable time is required in such a case, this is unsuitable for use in a high speed, continuous coating process in which rapid curing is required, for example, by coating objects travelling at a speed of over several tens of meters per minute. Consequently, it is generally desirable to add a photosensitizer in order to accelerate photocuring. Photosensitizers which can be used are cinnamic compounds, azo compounds, diazo compounds, thiuram compounds, halogen compounds, peroxides, azide compounds, carbonyl compounds coloring matter compounds, organic phosphorus compounds and inorganic salts. These compounds may be added independently or as a mixture of two or more in amounts of between about 0.05 to 5.0 wt. percent. Cinnamyl alcohol, β-ionone, α-amylcinnamic aldehyde, cinnamyl acetate, methyl cinnamate, ethyl cinnamate, cinnamic aldehyde or α-isopropyl and α-methyl cinnamic aldehyde can be used as the cinnamic compounds and azo-bis-isopropane, azo-benzene, 2,2'-azo-bis-isobutyronitrile, 2,2'-azo-bis-dimethyl valeronitrile, 2,2'-azo-bis (2,3,3-trimethyl-butylnitrile) 2,2'-(thiocyanate)-2,2'-azopropane, 2-phenylazo-2,4,4-tri-methyl valeronitrile, α-naphthyl azo-α-isobutryonitril or 2,2'-azo-bis-(2,4,4-tri-methylvaleronitril) can be used as the azo compound. Also, diazoaminobenzene, para-diethyl amino-benzene diazonium chloride, para-chlorobenzene diazonium chloride, the zinc salt of 5-nitro-2-aminoanizolediazonium chloride or the zinc salt of α-amino-anthraquinonediazonium chloride can be used as the diazo compound, and tetramethylthiuram monosulfide, diphenyl disulfide, dibenzoyl disulfide, 2-mercapto-5-methylmercapto-1, 3,4-thiadiazol, naphthalene-2-sulfonylchloride, diphenyl sulfoxide, dibutyl sulfoxide, methyl benzyl sulfoxide, dibenzyl sulfoxide, diamyl sulfoxide, dihexyl sulfoxide, dioctyl sulfoxide, didecyl sulfoxide, α-naphthyl sulfoxide, ethyl dodecyl sulfoxide, di-n-butyl disulfide, di-n-octyl disulfide, dibenzyl disulfide, diallyl disulfide, diacetyl disulfide, dilauroyl disulfide, dibornyl disulfide, N,N'-dipentamethylene thiuram disulfide, tetraethylthiuram disulfide, tetrabutylthiuram disulfide, and tetramethylthiuram disulfide can be used as the thiuram compound. Further, β-chlorostyrene, α-chlorostyrene, β-bromostyrene, α-bromostyrene and carbon tetrachloride can be used as the halogen compound; di-tert-butyl peroxide, benzoyl peroxide, acetyl peroxide and methyl ethyl ketoneperoxide can be used as the peroxide compound, and 4,4'-diazidostilbene, p-phenylene-bis-azide, 4,4'-diazidobenzophenone, 4,4'-diazidophenyl methane and 4,4'-diazidochalcone as the azide compound. Biacetyl, benzophenone, benzil, benzoin, benzoin methylether, benzoin ethylether, benzoin isopropylether, phenacylbromide, p-bromophenacylbromide, desylchloride and α-methylbenzoin can be used as the carbonyl compound. Fluorescein, eosine, crystal violet, thiazine, rose bengal, erythrosine, 2,4,5,6-tetrachloro-2',4',5',7'-tetrabromofluorescein, acridine orange, acridine yellow, thianine, phthalocyanine blue and victoria blue can be used as the coloring matter compound. Triphenyl phosphine, tri-o-tolylphosphine, tri-p-tolylphosphine and tri-m-tolylphosphine can be used as the organic phosphorus compound. Uranyl nitrate and cerium nitrate are examples of the inorganic salt which may be used.

Also, the photocuring effect can be increased further by using 0.1 – 1.0 wt. percent of anthraquinone, 2-nitrofluorene or 5-nitroacenaphthene as photocuring accelerators along with the above photosensitizers.

There are compounds among these photosensitizers which are stable against heat, such as cinnamic acid compounds and tetramethylthiuram monosulfide, and storage for a long period of time is possible with the photosensitizer added as it is.

When the composition prepared by the method of this invention is used as the coating material of various surfaces, it is possible to obtain a strong and hard surface by coating on the surface of the object and irradiating with light. Curing methods other than this can be used, such as the method of adding a redox polymerization initiator such as methylethyl ketone peroxide and cobalt naphthenate, to the composition before coating or, better still, the coating can be cured rapidly if light with a stronger activating property is irradiated such as in the high speed, continuous coating process where surfaces are coated at a speed of over several hundreds of meters per minute as in the case of coil coating. By using such methods, the advantages of using the compositions of the present invention become more pronounced.

The wavelength of light for photopolymerization in the present invention is usually between about 3000A and about 5200A. As the light source, besides sunlight, various light irradiation lamps emitting light from the extreme ultraviolet rays to the extreme infrared rays such as mercury lamps, xenon lamps, incandescent lamps and infrared lamps can be used. In particular, high intensity irradiation apparatus suitable for causing photochemical reaction industrially, such as low pressure, middle pressure, high pressure and ultra-high pressure mercury lamps, are available on the market so that the composition of this invention can be utilized industrially very easily.

The advantages of the method of this invention are that the curing speed is very fast and the density of cross-linkages produced in the cured coating is high, the cost of facility required for curing is low, heating is not required, and the composition can be coated on various kinds of materials, such as wood, paper, plastics and cloth. Also, when used as road paint or building paint, it cures rapidly by the effect of sunlight to form a tough, hardened coating and, consequently, it has superior practical advantages when used as an industrial paint and general purpose paint. More particularly, superior hardness, physical properties, e.g., adhesiveness, chemical properties, e.g., solvent resistivity and water resistivity, and also weatherability can be anticipated because of the high cross-linkage density of the cured coating. Thus it can be said that the significance of this invention is great.

The invention is described in detail by way of the following examples, but it is to be understood that the invention is not limited to the examples. Also, it must be pointed out that unless otherwise specified, the parts and percentages in the examples refer to parts by weight and percentages by weight.

1. Manufacture of Monomer Solution of Acrylic Resin Having Polymerizable Unsaturated Groups

EXAMPLE 1

450 parts of n-butyl acetate and 100 parts of maleic anhydride were placed in a reaction vessel provided with a thermometer, stirrer, dropping funnel, reflux condenser and tube for gas introduction, and the temperature of the contents increased to 115°C while stirring and passing nitrogen gas into it. When the temperature of the mixture reached 115°C, a mixture composed of 200 parts of styrene, 200 parts of n-butyl acrylate and 7.5 parts of benzoyl peroxide was added dropwise over a period of 2 hours from a dropping funnel. An hour after the addition of the vinyl monomer mixture had been completed, one half of a mixture composed of 50 parts of n-butyl acetate and 2.5 parts of benzoyl peroxide placed in the dropping funnel was added dropwise over a period of 15 minutes at 115°C and after 1 hour, the other half of the mixture was added dropwise over a period of 15 minutes. Then stirring was continued for 3 hours, the temperature of the contents dropped to 100°C, 132 parts of β-hydroxyethyl methacrylate and 0.05 part of hydroquinone were added to the reaction vessel and stirred for 1 hour 30 minutes at 100°C, by which time the esterification reaction was completed. After cooling, the resin varnish was poured into about 10 times its quantity of petroleum ether to precipitate the resin, the solvent in the resin extracted three times with fresh petroleum ether each time and the resin was dried under reduced pressure at room temperature to obtain the resin in a solid form.

Next, 100 parts of the solid resin was dissolved in a mixture of 60 parts of styrene, 40 parts of ethyl acrylate, 0.05 part of solid paraffin having a melting point of 62°C and 0.03 part hydroquinone to obtain the monomer solution. A vinyl monomer solution of acrylic resin having polymerizable unsaturated groups in the side chain was obtained by the above operation.

EXAMPLE 2

450 parts of dioxane and 75 parts of tetrahydrophthalic anhydride were placed in the same reaction vessel used in Example 1 and the temperature of the contents increased to 100°C while stirring and passing nitrogen gas into it. When the temperature of this mixture reached 100°C, a mixture composed of 50 parts methyl methacrylate, 125 parts n-butyl acrylate, 250 parts acrylic acid and 10 parts of benzoyl peroxide was added dropwise over a period of 3 hours from a dropping funnel. An hour after the addition of the vinyl monomer mixture had been completed, one half of a mixture composed of 50 parts dioxane and three parts benzoyl peroxide placed in the dropping funnel was added dropwise over a period of 15 minutes at 100°C and after 1 hour, the other half of the mixture was added dropwise over a period of 15 minutes. Then stirring was continued for 3 hours, the temperature of the contents dropped to 95°C, and 29 parts of allyl alcohol was added and the mixture was stirred for 2 hours at 95°C, by which time the esterification reaction was completed. The reaction product was cooled, the resin varnish poured into about 10 times its quantity of petroleum ether to precipitate the varnish, the solvent in the resin was extracted three times with fresh petroleum ether each time and the resin dried under reduced pressure at room temperature to obtain the resin in solid form. Next, 100 parts of this solid resin was dissolved in a mixture of 70 parts ethyl acrylate, 30 parts acrylic acid, 0.05 part solid paraffin having a melting point of 62°C and 0.03 part of hydroquinone to obtain the monomer solution. A vinyl monomer solution of acrylic resin having polymerizable unsaturated groups in the side chain was obtained by the above operation.

EXAMPLE 3

100 parts of n-butyl acetate and 350 parts of toluene were placed in the same reaction vessel as in Example 1, and the temperature of the contents was increased to 120°C while stirring and passing nitrogen gas into it. After the temperature of the contents reached 120°C, a mixture composed of 250 parts styrene, 200 parts lauryl methacrylate, 50 parts β-hydroxypropyl methacrylate and 7.5 parts di-tert-butyl peroxide was added dropwise over a period of 1.5 hours from a dropping funnel. An hour after the addition of the vinyl monomer mixture, a mixture composed of 50 parts toluene and 2.5 parts di-tert-butyl peroxide was added dropwise by way of a dropping funnel over a period of 20 minutes. Then stirring was continued for 3 hours, 34 parts of maleic anhydride was added and stirred for 1 hour at 120°C, at which point the esterification reaction was completed. The product was cooled, the resin varnish was poured into about 15 times its quantity of methanol to precipitate the resin, the solvent in the resin was extracted three times with fresh methanol each time and the resin was dried under reduced pressure at room temperature to obtain the resin in solid form. Next, 100 parts of this solid resin was dissolved in a mixture of 60 parts styrene, 60 parts ethyl acrylate, 0.05 part solid paraffin having a melting point of 62°C and 0.03 part of hydroquinone to obtain the monomer solution. A vinyl monomer solution of acrylic resin having polymerizable unsaturated groups in the side chain was obtained by the above operation.

EXAMPLE 4

100 parts of n-butyl acetate and 350 parts of mixed xylene (proportion of mixture from distillation percent was ortho-xylene/meta-xylene/para-xylene = 30/30/40) were placed in the same reaction vessel as that used in Example 1, the temperature of the contents was increased to 115°C while stirring and passing nitrogen gas into it, and after the temperature had reached 115°C, a mixture composed of 200 parts vinyl toluene, 175 parts 2-ethylhexyl acrylate, 125 parts β-hydroxyethyl acrylate and 7.5 parts benzoyl peroxide was added dropwise over a period of 2 hours from a dropping funnel. An hour after the addition of the vinyl monomer mixture had been completed, one half of a mixture composed of 50 parts mixed xylene and 2.5 parts benzoyl peroxide placed in the dropping funnel was added dropwise over a period of 15 minutes at a temperature of 115°C and after an hour, the other half was added dropwise over a period of 15 minutes. Then stirring was continued for 3 hours, 177 parts of endo-cis-bicyclo-(2,2,1-5-heptene-2,3-dicarboxylic anhydride (manufactured by Hitachi Kasei Kogyo Co. under the trade name of Himic Anhydride) was added, the stirring was continued for 1 hour 30 minutes at 115°C, at which point the esterification reaction was completed. The reaction product was cooled, the resin varnish was poured into about 10 times its quantity of petroleum ether to precipitate the resin, the solvent in the resin was extracted three times with fresh petroleum ether each time, and the resin was dried under reduced pressure at room temperature to obtain the resin in solid form. Next, 100 parts of this solid resin was dissolved in a mixture of 80 parts methacrylic acid, 20 parts n-butyl acrylate, 0.05 part solid paraffin having a melting point of 62°C and 0.03 part hydroquinone to obtain the monomer solution. A vinyl monomer solution of acrylic resin having polymerizable unsaturated groups in the side chain was obtained by the above operation.

EXAMPLE 5

150 parts of methyl methacrylate, 600 parts of ethyl acrylate and 200 parts of β-hydroxyethl methacrylate were placed in the same reaction vessel used in Example 1 and the temperature of the contents was increased to 90°C while stirring and passing nitrogen gas into it. After the temperature of the contents had reached 90°C, a mixture composed of 50 parts methyl methacrylate and 0.4 part benzoyl peroxide was added dropwise from a dropping funnel over a period of 1 hour 45 minutes. As there is a tendency of the temperature of the contents to rise during this reaction operation due to the heat of polymerization, the temperature was maintained at 90°C by controlling the heat source. 30 minutes after the dropwise addition of the mixture of methyl methacrylate and benzoyl peroxide was completed, 151 parts of maleic anhydride and 0.3 part of hydroquinone were added and stirred continuously for 2 hours at 90°C, at which point the esterification reaction was completed. The resin varnish thus-obtained was a viscous monomer solution containing 54 percent resin. This resin varnish was cooled and a mixture of 200 parts styrene and 0.05 part solid paraffin having a melting point of 62°C was added to prepare a monomer solution having a 45 percent resin content. A vinyl monomer solution of acrylic resin having polymerizable unsaturated groups in the side chain was obtained by the above operation.

EXAMPLE 6

850 parts of styrene and 100 parts of maleic anhydride were placed in the same reaction vessel as in Example 1 and the temperature of the contents was increased to 100°C while stirring and passing nitrogen gas into it. After the temperature of the contents had reached 100°C, a mixture composed of 50 parts styrene and 0.5 part benzoyl peroxide was added dropwise from a dropping funnel over a period of 2 hours and 30 minutes. During this operation, the temperature of the contents was maintained at 100°C. An hour after the dropwise addition of styrene and benzoyl peroxide was completed, 128 parts of β-hydroxypropyl acrylate and 0.3 part hydroquinone were added and stirred continuously for 2 hours and 30 minutes at 100°C, at which point the esterification reaction was completed. The resin varnish obtained was a viscous styrene solution containing 61 percent resin. This resin varnish was cooled and a mixture of 220 parts n-butyl acrylate and 0.05 part solid paraffin having a melting point of 62°C was added to prepare a monomer solution with a 50 percent resin content. A vinyl monomer solution of an acrylic resin having polymerizable unsaturated groups in the side chain was obtained by the above operation.

2. Curing by Light Irradiation

EXAMPLE 7

Table 1 shows the results of exposure to direct sunlight of the modified acrylic resin monomer solutions obtained in Examples 1 – 6. Also, the results of exposure to direct sunlight of monomer solutions of unmodified acrylic resins obtained by the same operations as in Examples 1 – 6 but without carrying out modification by half-esterification are also given for comparison purposes.

In all samples, 1.0 percent of tetramethylthiuram monosulfide on the basis of the monomer solution was added as photosensitizer. For irradiation, the monomer solution was coated on one side of a glass sheet of 1.5 mm thickness so that the thickness of the coating becomes 0.5 mm and exposed to sunlight from noon on a clear day with atmospheric temperature of 30°C. The extent of hardness of the coating after irradiation was tested by measuring the pencil scratch hardness and acetone-insoluble content.

TABLE 1

| Curing Time & Curing Efficiency of Coating<br>Samples Used For Irradiation | Time required for curing (min.) | Pencil scratch value of cured coating (Note 1) | Acetone-insoluble content of cured coating (%) (Note 2) |
| --- | --- | --- | --- |
| Example 1 Monomer solution of modified acrylic resin | 5 | 3H | 97.4 |
| Monomer solution of unmodified acrylic resin | 45 | B | 0 |
| Example 2 Monomer solution of modified acrylic resin | 5 | 2–3H | 95.9 |
| Monomer solution of unmodified acrylic resin | 60 | 2B | 0 |
| Example 3 Monomer solution of |  |  |  |

TABLE 1-Continued

| Curing Time & Curing Efficiency of Coating<br>Samples Used For Irradiation | Time required for curing (min.) | Pencil scratch value of cured coating (Note 1) | Acetone-insoluble content of cured coating (%) (Note 2) |
| --- | --- | --- | --- |
| modified acrylic resin | 5 | 3H | 96.2 |
| Monomer solution of unmodified acrylic resin | 45 | 2B | 0 |
| Example 4 | | | |
| Monomer solution of modified acrylic resin | 5 | 2H | 95.0 |
| Monomer solution of unmodified acrylic resin | 45 | 2B | 0 |
| Example 5 | | | |
| Monomer solution of modified acrylic resin | 5 | 3H | 97.2 |
| Monomer solution of unmodified acrylic resin | 45 | 2B | 0 |
| Example 6 | | | |
| Monomer solution of modified acrylic resin | 5 | 3H | 98.0 |
| Monomer solution of unmodified acrylic resin | 45 | B | 0 |

(Note 1)
The scratched value of coating with a pencil was measured in accordance with the following method (JIS-K-5652 5.15 specification).
After a specimen was left for 24 hours in a thermohygrostated chamber maintained at a temperature of 20±1°C and a relative humidity of 75±3%, it was set horizontally in the chamber and strongly scratched with a sharpened pencil. The value was expressed by the hardness of the hardest pencil which could not make a scratch on the coated surface.
This test is also applicable to Examples 9, 10 and 11, described below.

(Note 2)
The coating after irradiation was scraped off, dipped in acetone at 50°C, left standing for 50 hours with frequent shaking, the soluble portion filtered off, the residue washed with acetone, dried under reduced pressure and weighed. It is possible to know relatively the extent of cross-linkages formed by the amount of this acetone-insoluble content.

EXAMPLE 8

1 part of 2,2'-azo-bis-isobutyronitrile was dissolved in 100 parts of the monomer solution of the modified acrylic resin obtained in Example 1, coated to a thickness of 20 microns on one side of a paper of 100 micron thickness and irradiated with a fluorescent chemical lamp (manufactured by Tokyo Shibaura Electric Co., Model FL-40BL) at an irradiation distance of 15 cm. As a result, the coating cured after irradiating for 1 minute.

Also separately, 2 parts of 2,2'-azo-bis-dimethylvaleronitrile was dissolved in 100 parts of a monomer solution of the modified acrylic resin obtained in Example 2, 20 parts of Cyanine Blue was dispersed in this to prepare blue enamel, this blue enamel was coated to a thickness of 10 micron on one side of a paper of 100 micron thickness and irradiated with the above-mentioned fluorescent chemical lamp at an irradiation distance of 15 cm. As a result, the coating cured after irradiating for 45 seconds.

EXAMPLE 9

2 parts of β-ionone and 0.5 part of anthraquinone were added to 100 parts of the monomer solution of modified acrylic resin obtained in Example 3, mixed thoroughly, coated to a thickness of 50 microns on one side of a 6 mm thick veneer plywood and irradiated with a ultra-high pressure mercury lamp (manufactured by Tokyo Shibaura Electric Co., Model SHL-100UV) at an irradiation distance of 10 cm. As a result, the coating cured after irradiating for 1 minute and the pencil scratch value of the cured coating was 2H.

Also, separately, 2 parts of tetramethyl thiuram disulfide was dissolved in 100 parts of the monomer solution of the modified acrylic resin obtained in Example 4, 10 parts of rutile type titanium dioxide was dispersed in this to prepare white enamel, and this white enamel was coated to a thickness of 10 micron on one side of a 6 mm thick veneer plywood and irradiated with the above-mentioned ultra-high pressure mercury lamp at an irradiation distance of 10 cm. As a result, the coating cured after irradiating for 30 seconds.

EXAMPLE 10

5 parts of 4,4'-diazidostilbene was added to 100 parts of the monomer solution of modified acrylic resin obtained in Example 5, mixed thoroughly, coated to a thickness of 100 microns on the paper-pasted surface of a 3 mm paper-pasted plywood and irradiated with a xenon lamp (manufactured by Ushio Electric Co., Model UXL-500D) at an irradiation distance of 20 cm. As a result, the coating cured after irradiating for 2 minutes and the pencil scratch value of the cured coating was 3H.

Also, separately, 0.5 part of diazoaminobenzene was dissolved in 100 parts of the monomer solution of the modified acrylic resin obtained in Example 6, 3 parts of carbon black was dispersed in this to prepare a black enamel, which black enamel was coated to a thickness of 5 microns on the paper-pasted surface of a 3 mm paper-pasted plywood and irradiated with the above-mentioned xenon lamp at an irradiation distance of 20 cm. As a result, the coating cured after irradiating for 20 seconds.

The particulars of this invention have been described above with examples and, as indicated in Examples 8 – 10, the compositions of this invention can be coated on organic substances such as paper and wood and then cured in a short time by irradiating light and, furthermore, the compositions of this invention become cured coatings wit high cross-linkage density by irradiating light. It is believed that this indicates superior properties from various viewpoints in practical use, and it can be said that this is a revolutionary invention as the desired objective can be attained by an easy curing method and low equipment cost.

EXAMPLE 11

200 parts of the modified acrylic resin obtained in Example 1 was dissolved in a mixture of 80 parts vinyltoluene, 60 parts n-butylmethacrylate, 40 parts divinylbenzene, 20 parts acrylonitrile and 0.1 part solid paraffin having a melting point of 62°C to obtain a monomer solution with 50 percent resin content. Photosensitizers as shown in Table 2 were added to samples of the above monomer solution. For irradiation, the monomer solution was coated on one side of a steel panel of 0.8 mm thickness so that the thickness of wet coating becomes 50 microns, then irradiated with a 2KW ultra-high pressure mercury lamp (manufactured by Tokyo Shibaura Electric Co., Model HB-2000) at an irradiation distance of 30 cm. The results are shown in Table 2.

Further, the photosensitizers of Table 2 are added in an amount of 1 percent with respect to the monomer solution, except with respect to samples No. 1 and 35. To sample No. 1 is added 2 percent cinnamyl alcohol and 1 percent 5-nitroacenaphthene, and to sample No. 35 is added 1.5 percent benzoyl peroxide and 0.2 percent acridine orange based on the monomer solution. Furthermore, samples No. 2 – 34, 36 and 37 were irradiated as soon as the photosensitizers were dissolved in the monomer solution, and only sample No. 14 was irradiated 24 hours after the photosensitizers were added to the monomer solution. The time required for curing is the time required to produce a cured coating which shows a pencil scratch value of H on the surface thereof.

TABLE 2

| Sample No. | Photosensitizer | Time required for curing (min.) |
|---|---|---|
| 1 | Cinnamyl alcohol + 5-nitroacenaphthene | 5 |
| 2 | α-amylcinnamic aldehyde | 10 |
| 3 | Cinnamyl acetate | 20 |
| 4 | Azo-bis-isopropane | 1 |
| 5 | Azo-benzen | 2 |
| 6 | 2-phenylazo-2,4,4-Tri-methyl valeronitrile | 45/60 |
| 7 | α-naphthyl azo-α-isobutyronitrile | 1 |
| 8 | Diazoaminobenzene | 1 |
| 9 | α-aminoanthraquinone diazonium chloride | 5 |
| 10 | 5-nitro-2-aminoanisolediazonium chloride | 6 |
| 11 | Diphenyl disulfide | 1.5 |
| 12 | 2-mercapto-5-methylmercapto-1,3,4-thiadiazol | 2 |
| 13 | Diphenyl sulfoxide | 2 |
| 14 | Naphthalene-2-sulfonylchloride | 1 |
| 15 | di-n-butyl disulfide | 1.5 |
| 16 | β-chlorostyrene | 10 |
| 17 | β-bromostyrene | 15 |
| 18 | Benzoyl peroxide | 10 |
| 19 | Acetyl peroxide | 10 |
| 20 | Methyl ethyl peroxide | 10 |
| 21 | Benzil peroxide | 1 |
| 22 | Benzoin | 1 |
| 23 | Benzoin methylether | 40/60 |
| 24 | Benzoin isopropylether | 40/60 |
| 25 | Benzoin ethylether | 40/60 |
| 26 | Desylchloride | 45/60 |
| 27 | Phenacylbromide | 50/60 |
| 28 | p-Bromophenacyl bromide | 1 |
| 29 | p-Phenylene-bis-azide | 5 |
| 30 | 4,4'-diazidochalcone | 5 |
| 31 | Eosine | 2 |
| 32 | Fluorescein | 5 |
| 33 | Erythrosine | 3 |
| 34 | Phtarocyanine blue | 5 |
| 35 | Acridine orange + benzoyl peroxide | 1 |
| 36 | Triphenyl phosphine | 3 |
| 37 | Tri-o-tolylphosphine | 3 |

What is claimed is:

1. In a method of photocuring a photocuring coating composition which comprises applying a photocuring coating composition to the surface of the object to be coated and irradiating the thus-coated surface with light to effect the curing of the composition, the improvement whereby the photocuring coating composition consists essentially of from 0.05 to 5.0 percent by weight of a photosensitizer blended into a vinyl monomer solution of an acrylic resin containing unsaturated groups, said vinyl monomer solution of acrylic resin being obtained by polymerizing a polymerizable unsaturated monomer having an acid anhydride group with a liquid vinyl monomer or mixture thereof without using a non-polymerizable organic solvent in the reaction system until about 30 to 70 percent of the monomers are polymerized, then reacting the thus-obtained polymer with a polymerizable unsaturated vinyl monomer having a hydroxyl group in such amounts so as to produce a half ester thereof without using a non-polymerizable organic solvent in the reaction system.

2. In a method of photocuring a photocuring coating composition which comprises applying a photocuring coating composition to the surface of the object to be coated and irradiating the thus-coated surface with light to effect the curing of the composition, the improvement whereby the photocuring coating composition consists essentially of from 0.05 to 5.0 percent by weight of a photosensitizer blended into a vinyl monomer solution of an acrylic resin containing unsaturated groups, said vinyl monomer solution of acrylic resin being obtained by polymerizing a polymerizable unsaturated monomer having a hydroxyl group with a liquid vinyl monomer or mixture thereof without using a non-polymerizable organic solvent in the reaction system until about 30 to 70 percent of the monomers are polymerized, then reacting the thus-obtained polymer with a polymerizable unsaturated vinyl monomer having an acid anhydride group in such amounts so as to produce a half ester thereof without using a non-polymerizable organic solvent in the reaction system.

3. The improvement according to claim 2 in which said photosensitizer is at least one compound selected from the group consisting of cinnamic acid compounds, azo compounds, diazo compounds, thiuram compounds, halogen compounds, peroxides, azide compounds, carbonyl compounds, organic coloring matter compounds, organic phosphorus compounds and nitrates of uranium or cerium.

4. The improvement according to claim 2 in which said polymerizable unsaturated monomer having a hydroxyl group is at least one compound selected from the group consisting of hydroxyalkyl methacrylate esters, hydroxyalkyl acrylate esters and allylic unsaturated alcohols.

5. The improvement according to claim 2 in which said polymerizable unsaturated monomer having an acid anhydride group is at least one compound selected from the group consisting of maleic anhydride, tetrahydrophthalic anhydride and endo-cis-bicyclo-(2,2,1)-5-heptene-2,3-dicarboxylic anhydride.

6. The improvement according to claim 2 in which a photocuring accelerator which is selected from the group consisting of anthraquinone, 2-nitrofluorene, and 5-nitroacenaphthene is added.

7. The improvement according to claim 6, wherein the photocuring accelerator is present in an amount of 0.1 to 1.0 wt. percent.

8. The improvement according to claim 2 in which said liquid vinyl monomer is at least one compound selected from the group consisting of acrylic acid, alkyl acrylate esters, methacrylic acid, alkyl methacrylate esters, styrene and vinyltoluene.

* * * * *